US012648516B2

(12) United States Patent
Morabit

(10) Patent No.: US 12,648,516 B2
(45) Date of Patent: Jun. 9, 2026

(54) FLEXIBLE CUTTING BLADE FOR GRASS TRIMMERS AND ROTARY MOWERS

(71) Applicant: Aero-Flex Technologies, Inc., Rock Hill, SC (US)

(72) Inventor: Vincent D. Morabit, Rock Hill, SC (US)

(73) Assignee: AERO-FLEX TECHNOLOGIES, INC., Rock Hill, SC (US)

( * ) Notice: Subject to any disclaimer, the term of this patent is extended or adjusted under 35 U.S.C. 154(b) by 134 days.

(21) Appl. No.: 18/630,153

(22) Filed: Apr. 9, 2024

(65) Prior Publication Data

US 2024/0334870 A1 Oct. 10, 2024

Related U.S. Application Data

(60) Provisional application No. 63/458,240, filed on Apr. 10, 2023.

(51) Int. Cl.
*A01D 34/73* (2006.01)
*A01D 101/00* (2006.01)

(52) U.S. Cl.
CPC ........ *A01D 34/736* (2013.01); *A01D 2101/00* (2013.01)

(58) Field of Classification Search
CPC .. A01D 34/736; A01D 34/733; A01D 34/168; A01D 2101/00
See application file for complete search history.

(56) References Cited

U.S. PATENT DOCUMENTS

| | | | | | |
|---|---|---|---|---|---|
| 4,126,991 | A | * | 11/1978 | Gobin | A01D 34/4168 |
| | | | | | 56/295 |
| 4,165,597 | A | | 8/1979 | Scanland et al. | |
| 5,761,816 | A | * | 6/1998 | Morabit | A01D 34/4168 |
| | | | | | 428/397 |
| 5,996,233 | A | * | 12/1999 | Morabit | A01D 34/4168 |
| | | | | | 30/276 |
| RE36,940 | E | | 11/2000 | Fogle | |
| 6,314,848 | B2 | | 11/2001 | Morabit | |
| 7,210,231 | B2 | | 5/2007 | Legrand | |
| 9,414,540 | B2 | | 8/2016 | Morabit | |
| 9,474,205 | B2 | * | 10/2016 | Morabit | A01D 34/733 |
| 10,631,458 | B2 | | 4/2020 | Morabit | |
| 11,464,162 | B2 | * | 10/2022 | Morabit | A01D 34/4166 |
| D992,989 | S | * | 7/2023 | Morabit | D8/8 |
| 12,219,896 | B2 | * | 2/2025 | Morabit | A01D 34/4168 |
| 2001/0003935 | A1 | * | 6/2001 | Morabit | B29C 53/14 |
| | | | | | 83/13 |
| 2005/0188544 | A1 | | 9/2005 | Legrand | |

(Continued)

*Primary Examiner* — Omar Flores Sanchez
(74) *Attorney, Agent, or Firm* — NIXON & VANDERHYE P.C.

(57) ABSTRACT

A cutting blade for a rotating trimmer includes a loading section at a proximal end securable to the rotating trimmer, a flexible hinge section extending from the loading section, and a transition section extending from the flexible hinge section. A cutting section extends from the transition section to a distal end. The transition section and the cutting section are tapered at a taper angle toward the distal end. In some variations, a mass of the transition section is greater than a mass of the cutting section, and a center of gravity based on a mass of the cutting blade may be positioned closer to the loading section than the cutting section.

19 Claims, 12 Drawing Sheets

(56)         References Cited

U.S. PATENT DOCUMENTS

| | | | |
|---|---|---|---|
| 2010/0101099 A1 | 4/2010 | Morabit | |
| 2012/0102762 A1 | 5/2012 | Cigarini | |
| 2012/0208021 A1 | 8/2012 | Yang | |
| 2016/0044864 A1 | 2/2016 | Hermann | |
| 2016/0143220 A1 | 5/2016 | Child | |
| 2018/0184588 A1* | 7/2018 | Morabit | A01D 34/4166 |
| 2020/0120864 A1* | 4/2020 | Morabit | A01D 34/4166 |
| 2020/0281116 A1 | 9/2020 | Guo et al. | |
| 2020/0305343 A1* | 10/2020 | Morabit | A01D 34/4166 |
| 2020/0375100 A1 | 12/2020 | Skinner | |
| 2021/0092898 A1 | 4/2021 | Ishikawa et al. | |
| 2022/0007573 A1* | 1/2022 | Kloepfer | A01D 34/733 |

* cited by examiner

T2

FLEXIBLE CUTTING BLADE FOR GRASS TRIMMERS AND ROTARY MOWERS

CROSS-REFERENCES TO RELATED APPLICATIONS

This application claims the benefit of U.S. Provisional Patent Application No. 63/458,240, filed Apr. 10, 2023, the entire content of which is herein incorporated by reference.

STATEMENT REGARDING FEDERALLY SPONSORED RESEARCH OR DEVELOPMENT (Not Applicable)

BACKGROUND

The invention relates to cutting blades for a rotating trimmer and, more particularly, to cutting blades that are configured to cut vegetation more effectively and to better react after impact with an obstacle.

During high-speed trimming operations, it is common for multi-bladed cutting systems to impact solid objects the blades cannot sever. The longer time the cutter is engaged in an impact collision, the more power the driving motor has to provide. This results in the waste of precious battery charge power.

During normal trimming, the often and more frequent collisions occur involving very harmful high impact and rapid speed decelerations when the high energy moving blades cannot sever through such obstacles mixed in with grass and other vegetation along the intended cutting path. During these impact events, rapid forces immediately spike battery and motor amps.

Pin-pivoting hard blades (also known as flail blades) have been used when conventional string could not perform when trying to cut heavier vegetation. FIG. 7A shows an exemplary rigid flail blade. Flail blades can cut better than string. These existing hard brittle plastic blades, however, typically shatter upon impact with solid obstacles they cannot cut. Common blade failures at the pin result when the rigid blade tries to turn or twist (in the Z-axis) on the pin, thus causing breakage. Common impact failures elsewhere along the blade also result in shattering due to brittleness in combination within such a rigid system. See FIGS. 7B and 7C. When the blades shatter, flying fragments are a safety concern. The impact forces are so often excessive to result in shattering at the pin or at the point of impact (e.g., against a fence post, a piece of metal fence, or even a piece of common brush). The plastic flail blades are harder in order to withstand the impact stresses around the pivot pin. Therefore, they are generally very brittle. They pivot on a solid pin that is connected to a rotating base. They can be parallel shaped or tapered or with a serrated edge. After a hard impact with a metal fence, for example, they cannot absorb the axial shock forces $F_r$ because of their solid pin connection and structure. Therefore, they often break at the post or along the blades length before they can begin to pivot on their connecting pin. The rigid flail blades are notorious for fracturing. When they break there are flying projectiles, as well as high vibration due to imbalance resulting from the loss of the initial balance. This will cause an increase in vibration.

Flexible line blades were introduced to the replacement market in the early 2000s. An exemplary flexible line blade is shown in FIG. 8A. The flexible line blade development centered around a molded process that enabled different beneficial geometries within a single blade. This construction offered numerous improvements to conventional cutting string. Exemplary flexible blades are described in U.S. Pat. No. 6,314,848 with a living hinge that exited the head vertically, and a transitional zone that changed to a blade-like member that ran near parallel to the rotational plane. U.S. Pat. No. 5,996,233 describes further improvements for aerodynamics. U.S. Pat. No. 10,631,458 describes three unique zones, and U.S. Publication 2020/0305343 describes reversible directions. The contents of each of the noted patents/publications are hereby incorporated by reference.

During actual use of these prior parallel line blade designs, when confronting an obstacle it could not cut, the conventional flexible blade hits the obstacle and twists toward the flat with a tendency to continue wrapping around the obstacle. The blade somewhat sticks to hinder it from quickly releasing from the obstacle as it wraps around the obstacle (as observed with high-speed photography). See FIG. 8B. The duration of the contact is considered excessive, and the driving torque increases while the blade stays on longer, thereby wasting power. Additionally, excess stress is applied to the line thus reducing the useful life.

SUMMARY

The hinge design of the described blade allows bending flexure opposite to the obstacle, which permits the blade to slide back or glide past the obstacle. Inherent to this action is that it allows the impact force (magnitude F) to resolve into two components: a reduced tangential component $F_t$, and an increased radial component $F_r$, directed inward toward the axis of rotation, which corresponds to a centripetal force that acts to maintain circular motion and counters the outward pull on the hinge.

An added benefit accrues from the fact that as the blade deflects into a curvature, its entire length is subjected to reduction in radial distance, i.e. reduced radius arm, of each point on the blade. (The outermost tip must move in until it clears the object). By the conservation of angular momentum (a standard physical law), the angular velocity ($\omega$ rad/sec) increases. That is, if an element of mass, m, moves inward from $r_1$ to $r_2$ then $m\omega_1 r_1 = m\omega_2 r_2$ or $\omega_2 = \omega_1(r_1/r_2)$. The increased rotational speed (or RPM) enhances the blade's releasing from the obstacle without increasing input energy. An illustrative analogy is the classic example used in basic physics lessons of a figure skater spinning with his/her arms out and then wrapping them inward to make the rotation more rapid.

A second feature of the blade is its tapered, trapezoidal planform with the wider portion of increased mass inboard. The outward directed narrowing provides an additional "sweepback" angle to the normal (perpendicular to surface) impact direction added to the angle created by the blade flexure as shown in FIG. 10, where $\Theta_2$ is the angle due to flexure (to the order of 17+ degrees) and $\Theta_1$ is the blade taper angle (nominally greater than zero and less than or equal to 8 degrees). In the current blade configuration, $\Theta_1$ is small and included in $\Theta_2$. The taper provides the important initial relief enabling the blade to more easily start the important sliding process toward being free of the obstacle and both further will decrease the tangential $F_t$ component to cos $(\Theta_1+\Theta_2)F$ while increasing the radial component to $F_r=\sin(\Theta_1+\Theta_2)F$. Having the initial sliding release is significant as it helps to reduce the torque jolt on the motor and mitigates spikes relative to a straight, rigid blade (flail), and the $F_r$ increases the centripetal effect described above.

The tapered, trapezoidal shape of the described blade causes the mass to increase with decreasing radius so that the mass elements with long radii arms relative to the obstacle have increased momentum forces that "pull" the blade inward past the obstacle to a greater degree than a straight blade.

It has been shown in field testing that as the described blade undergoes wear, it develops a shallow curved shape thus adding another $\Delta\Theta$ to $\Theta_2$ combined defines $(\Theta_3)$ thus further increasing the pushback force $F_r=\cos(\Theta_1+\Theta_2+\Theta_3)F$. This is a phenomena itself that can be noted to resemble the shape of various historic battle swords that were known and proven for effective deep cutting and fast withdrawal clearing. Of particular comparison is the noted 'Katana' sword, used by the Samurai, that has been carefully studied to verify that the specially shaped shallow curved blade was clearly more efficient for slash-penetrating armor and the opponents inside than straight blades and also withdrew more quickly and easily. It may be reasonably inferred that the natural shaping undergone by the described blade supplies added effectiveness to its cutting and escape capability.

Objectives of the described embodiments are to reduce the collision event time and create a quick release while softening the effects of impact. Multiple things happen at the same time. The shorter the duration of an impact, the less power loss and reduction in wear rate. The described embodiments uniquely work toward reducing tangential forces (lowering torque spikes) while increasing inward radial forces that assist in a more rapid release away from the obstacle. When the blade bends toward the center, it pulls away faster from the obstacle. These features are beneficial energy reducers for both gas and battery trimmers, particularly for battery trimmers, in reducing amperage spiking. Generally, high amp breakers are provided, which helps reduce annoying trip-offs of battery trimmers while reducing blade damage.

The tapered flexible blade of the described embodiments compared to the conventional straight flexible blade has other advantageous features during normal trimming and mowing. For example, because of the added mass and its more inward location, there is a greater ability to sever much heavier vegetation (e.g., via higher kinetic energy). The blade uniquely works to reduce motor running torque, which in turn prevents overpowering the motor. Additionally, the blade will act as a governor by bending more (self-turning) when the vegetation loading gets too heavy for the motor's torque. The blades will tend to naturally back-off or self-release due to their construction.

In an exemplary embodiment, a cutting blade for a rotating trimmer includes a loading section at a proximal end securable to the rotating trimmer, a flexible hinge section extending from the loading section, and a transition section extending from the flexible hinge section. A cutting section extends from the transition section to a distal end. The transition section and the cutting section are tapered at a taper angle toward the distal end.

A mass of the transition section may be greater than a mass of the cutting section.

The cutting blade is rotated in a cutting plane, and the flexible hinge section may be oriented perpendicular to the cutting plane. The transition section may be oriented parallel to the cutting plane.

A center of gravity based on a mass of the cutting blade may be positioned closer to the loading section than the cutting section. A mass of the transition section may be controlled by adding or subtracting material that affects a thickness of the transition section. A cross-section of the cutting section may be symmetrical. A cross-section of the cutting section may be trapezoidal.

The cutting section may be configured to wear via use such that one side of the cutting section tapers at a use angle greater than the taper angle. The taper angle may be less than or equal to 8 degrees, and the use angle may be greater than 8 degrees and less than or equal to 45 degrees. In some embodiments, one side of the cutting section tapers at a use angle greater than the taper angle such that the cutting blade is configured for only clockwise rotation or only counterclockwise rotation.

In another exemplary embodiment, a method of manufacturing a cutting blade includes the steps of (a) forming a loading section at a proximal end securable to the rotating trimmer; (b) forming a flexible hinge section extending from the loading section; (c) forming a transition section extending from the flexible hinge section; and (d) forming a cutting section extending from the transition section to a distal end. Steps (c) and (d) are practiced such that the transition section and the cutting section are tapered at a taper angle toward the distal end.

Steps (a)-(d) may be practiced via molding. Steps (a)-(d) may be practiced using nylon copolymers.

BRIEF DESCRIPTION OF THE DRAWINGS

These and other aspects and advantages will be described in detail with reference to the accompanying drawings, in which.

DETAILED DESCRIPTION

Figure 1:
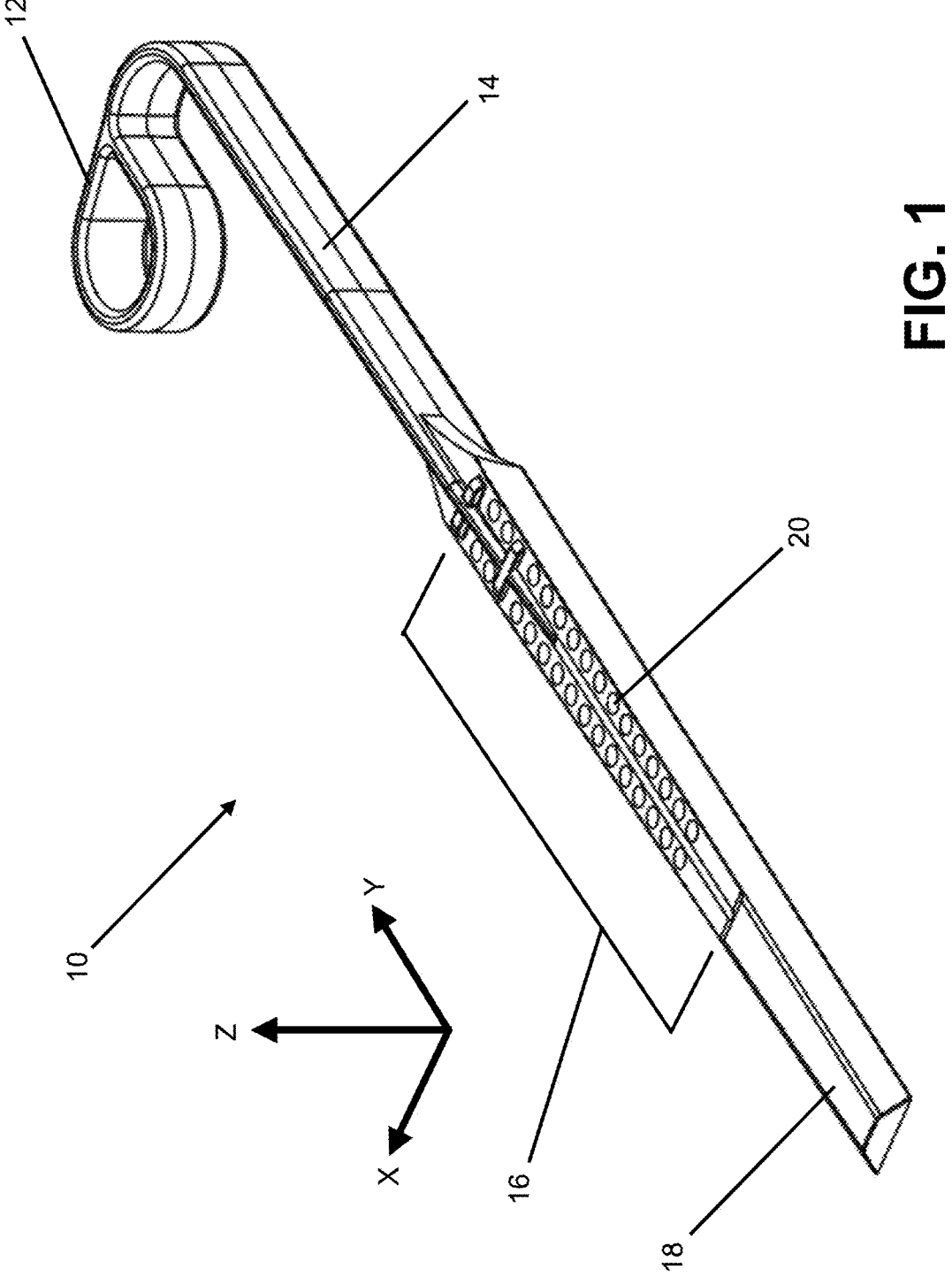
FIG. 1 shows an exemplary flexible cutting blade according to the described embodiments.
Figure 2:
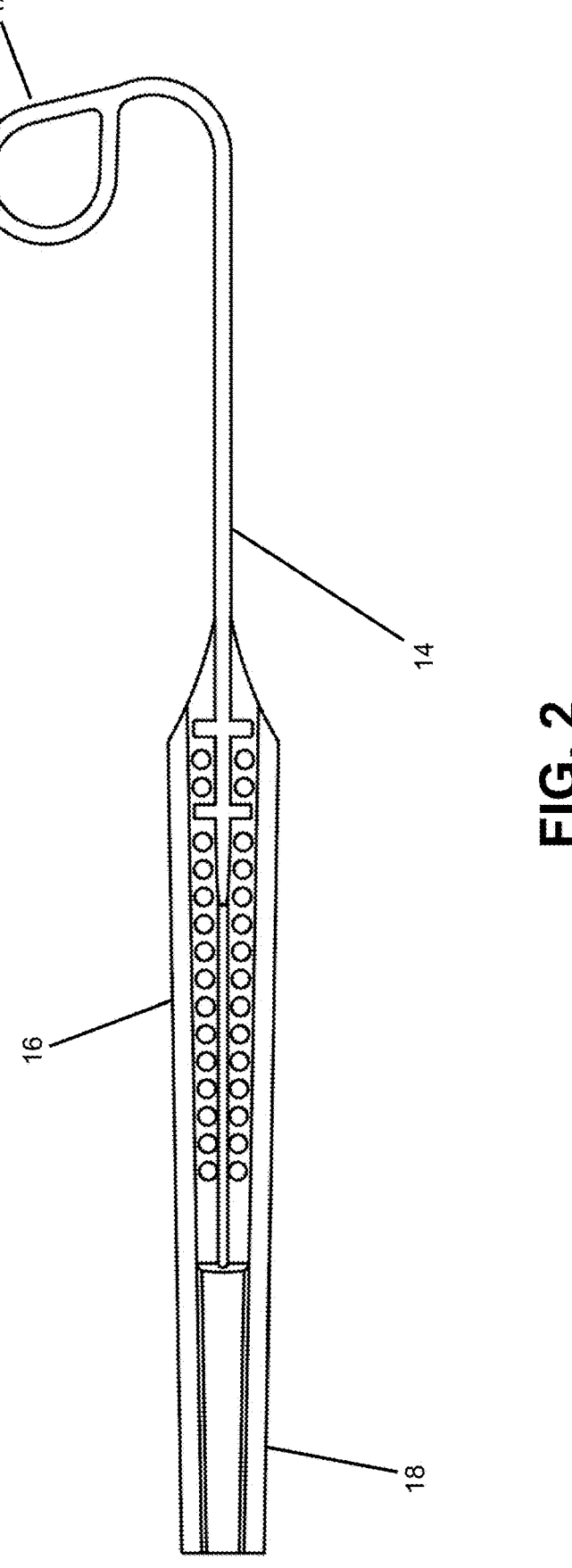
FIG. 2 is a plan view of the exemplary cutting blade.
Figure 5:
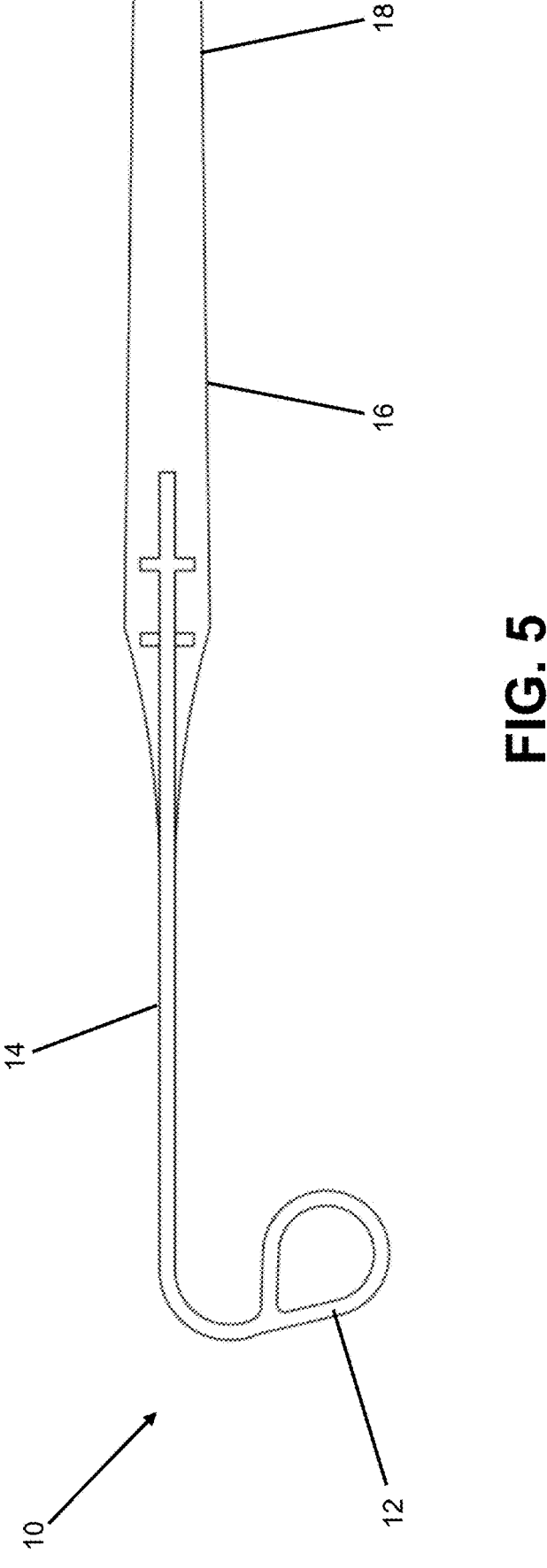
FIG. 5 shows a variation of the cutting blade.

With reference to FIGS. 1, 2 and 5, a cutting blade 10 for a rotating trimmer includes a loading section 12 at a proximal end securable to the rotating trimmer. A flexible hinge section 14 extends from the loading section 12, and a transition section 16 extends from the flexible hinge section 14. A cutting section 18 extends from the transition section 16 to a distal end. With particular reference to FIGS. 2 and 5, the transition section 16 and the cutting section 18 are tapered at a taper angle toward the distal end. In some embodiments, the taper angle is greater than 0 degrees and less than or equal to 8 degrees. The transition section 16 may also be provided with dimples 20 or the like for improved aerodynamics during use.

In use, the cutting blade 10 is rotated in a cutting plane. A major axis of the flexible hinge section 14 is oriented perpendicular to the cutting plane. That is, the flexible hinge section 14 is narrower in its X-axis dimension than its Z-axis dimension to facilitate pivoting on an axis that is perpendicular to the cutting plane. The pivot axis extends through the page in FIG. 2. The transition section 16 and the cutting section 18 are oriented 90 degrees relative to the flexible hinge section 14. As such, the transition section 16 and the cutting section 18 are oriented parallel to the cutting plane.

Due to the tapered construction of the transition section 16 and the cutting section 18, a mass of the transition section 16 is greater than a mass of the cutting section 18. As such, a center of gravity (m) based on a mass of the cutting blade 10 is positioned closer to the loading section 12 than the cutting section 18 (m in FIGS. 9 and 11). The mass of the transition section 18 can be controlled by adding or subtracting material in the Z-axis, i.e., effecting a thickness of the transition section 16.

Figure 3:
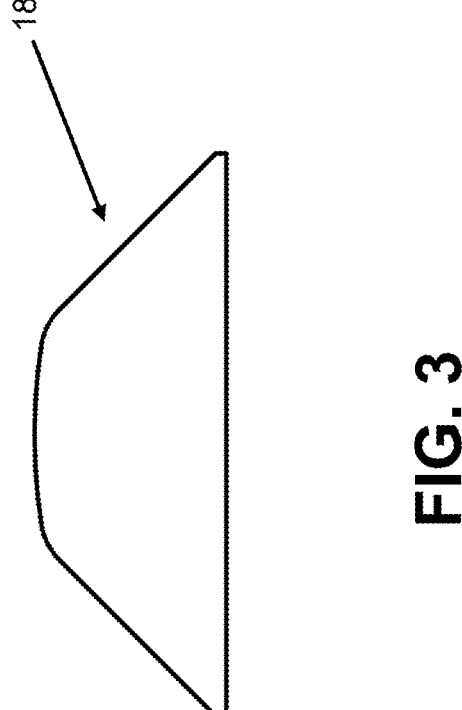
FIG. 3 is an end view of the cutting blade showing the cutting edge profile.
Figure 4:
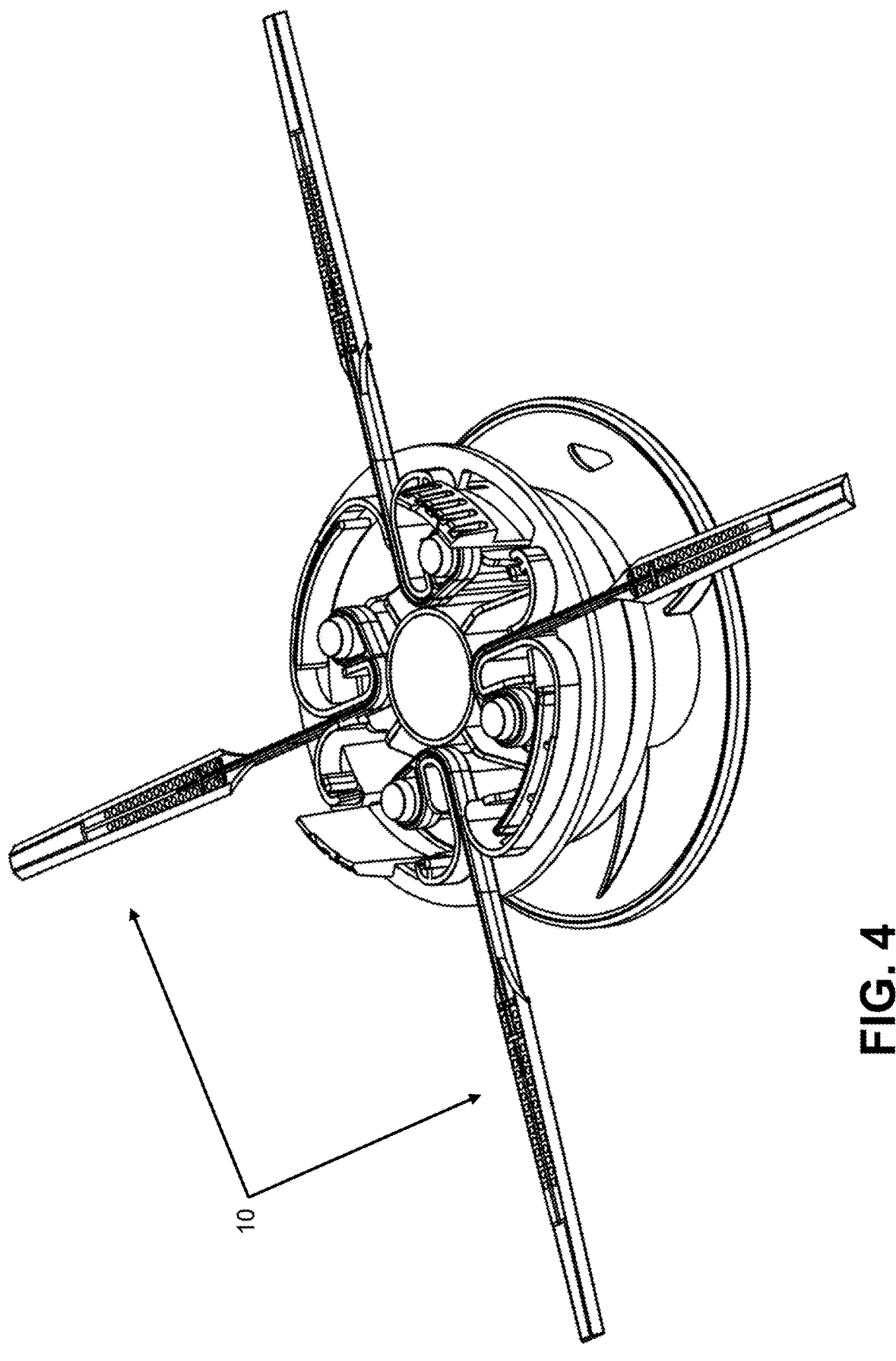
FIG. 4 shows an exemplary application with four of the cutting blades installed in a rotating trimmer.

In some embodiments, a cross-section of the cutting section 18 is symmetrical. In this manner, the cutting blade 10 is functional with rotating trimmers that rotate clockwise as well as with rotating trimmers that rotate counterclockwise. As shown in FIG. 3, an exemplary cross-section of the cutting section 18 is trapezoidal. The trapezoidal shape provides sharp leading edges for effective cutting while adding mass to the cutting section for increased kinetic energy during use. Moreover, the trapezoidal cross-section creates an updraft during use that lifts vegetation for cleaner cuts. Other shapes and configurations may be utilized including non-symmetrical cross-sections, and the invention is not necessarily meant to be limited to the described example.

Figure 6:
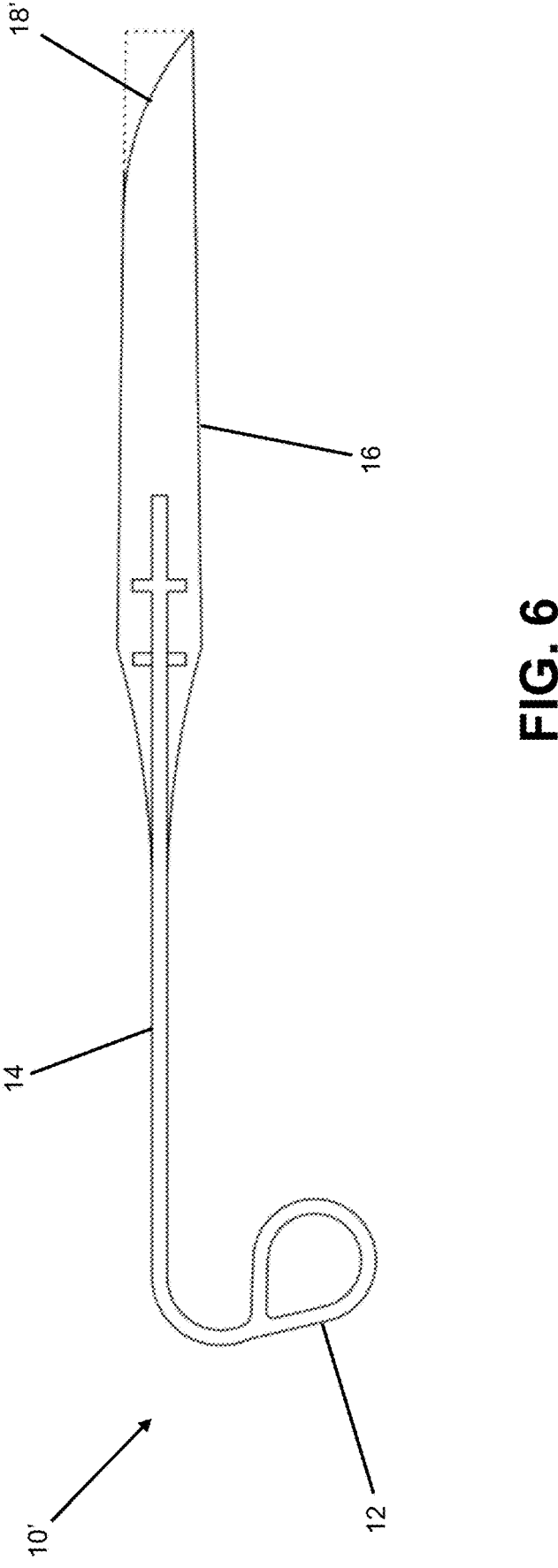
FIG. 6 shows a variation of the cutting blade with a further curved section formed by original manufacture or by wear.
Figure 7A:
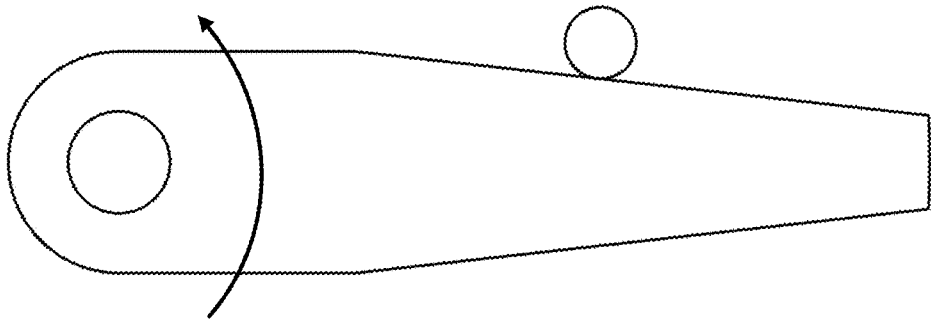
FIGS. 7A-7C show exemplary existing rigid flail blades and the consequences of impact with an obstacle.
Figure 7B:
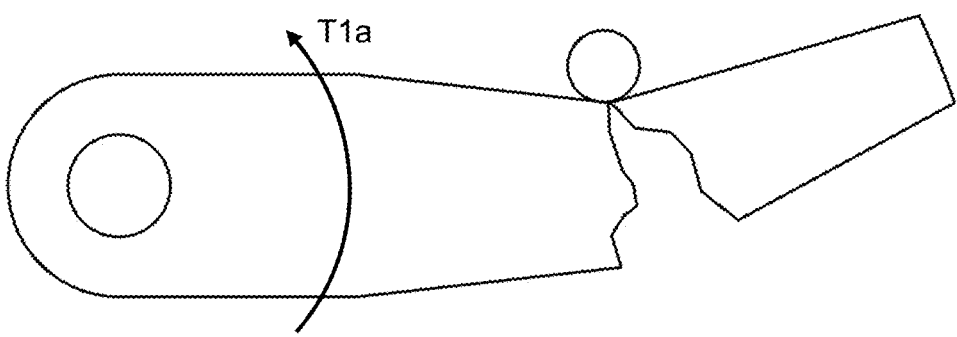
Figure 7C:
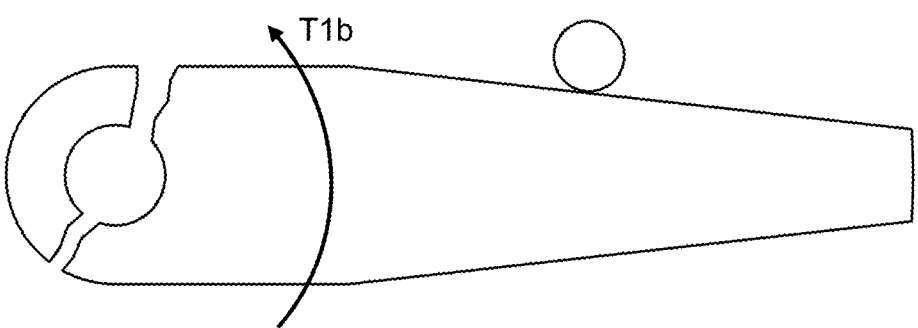
Figure 8A:
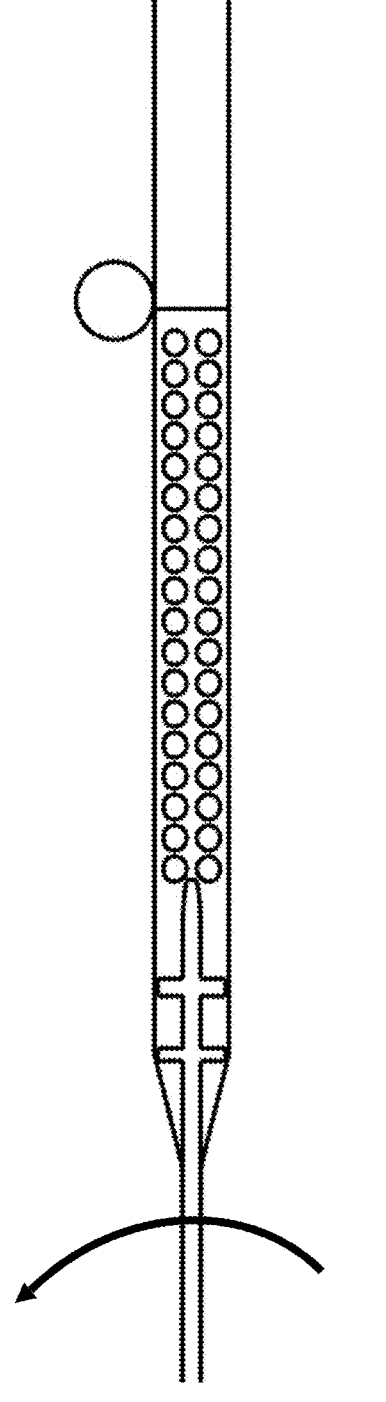
FIGS. 8A and 8B show an exemplary existing molded blade and the consequences of impact with an obstacle.
Figure 8B:
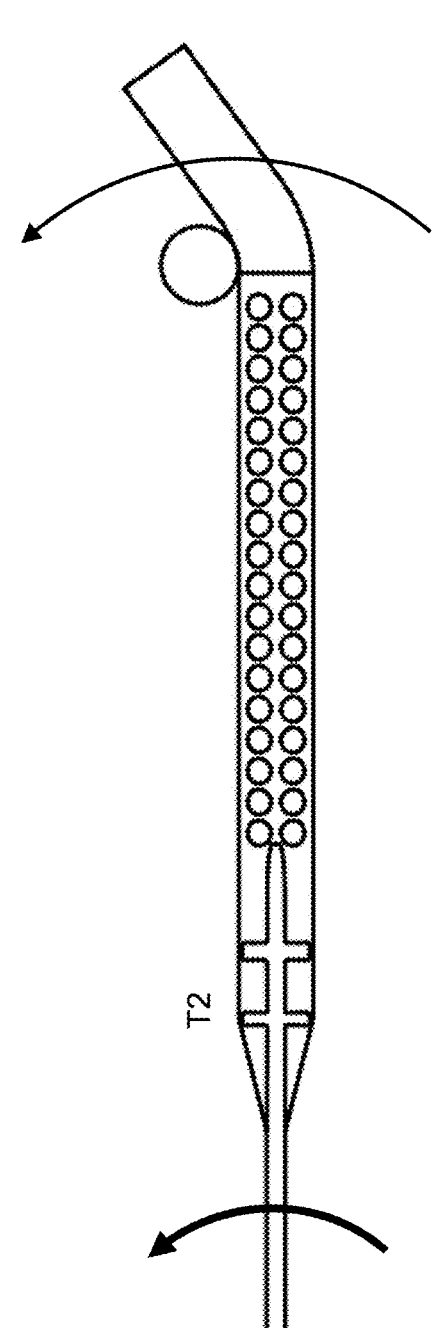
Figure 12:
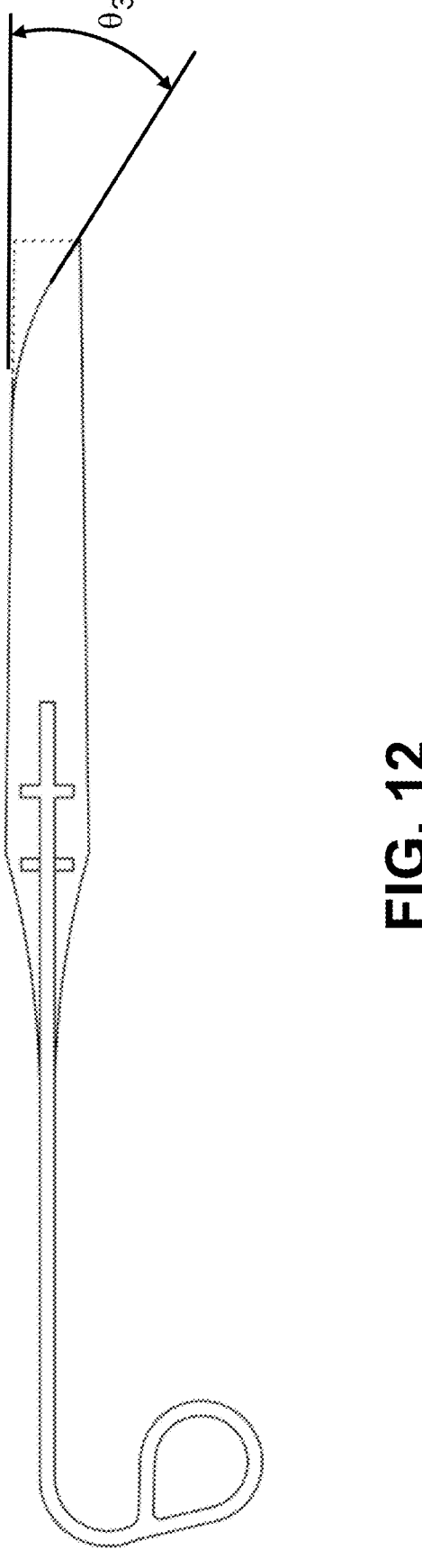
FIG. 12 shows an exemplary molded blade with a use angle included with original manufacture.

FIG. 6 shows a variation of the cutting blade 10' where the cutting section 18' tapers at a use angle greater than the tapered angle. In some embodiments, the use angle is a result of wear on one side of the cutting section 18'. That is, the cutting section 18 may be configured to wear via use such that one side of the cutting section tapers or is curved at a use angle greater than the taper angle. Similar wear does not occur with a straight/parallel blade as the blade of the described embodiments has an increasing width and a wider cross-section span as it wears back. Alternatively, the cutting section 18' may be originally manufactured with the use angle shown in FIG. 12. In some embodiments, the use angle is greater than 8 degrees and less than or equal to 45 degrees. In the originally manufactured example shown in FIG. 12, the use angle may be approximately 37 degrees, although the use angle may similarly be formed up to 45 degrees.

In some embodiments, the cutting blade is manufactured via molding using nylon copolymers. Other manufacturing processes and materials may alternatively be used. For example, the cutting blade may be manufactured via stamping or cold forming. Alternative materials may include metal, steel, aluminum, and the like.

The described blade utilizes a number of self-releasing features, working together in combination, to accelerate blade/object release by reducing the engagement time of the blades among other beneficial observations. The tapered or trapezoidal blade of the described embodiments will outperform flail blades and straight flexible line blades.

These helpful features include the combination of multiple features. A diminishing angular face of the cutter blade (trapezoidal angle $\Theta_1$) extending outward and away from the center of rotation, that in combination, with the mass located inwardly toward the center of rotation, makes $\Theta_2$, which is further additive, to effectively reduce $F_t$ while increasing $F_r$. Additionally, the higher mass momentum moves inward to become a speed increaser. Thus, the combination of these very real forces cumulatively assist itself with a faster release. The blade's faster slide-off and away from the obstacle is beneficial.

Any blade collision involving a high impact will also cause a loss of motor speed and stored rotational energy, which thereby needs added recovery power, thus another cause of wasteful power consumption.

Figure 9:
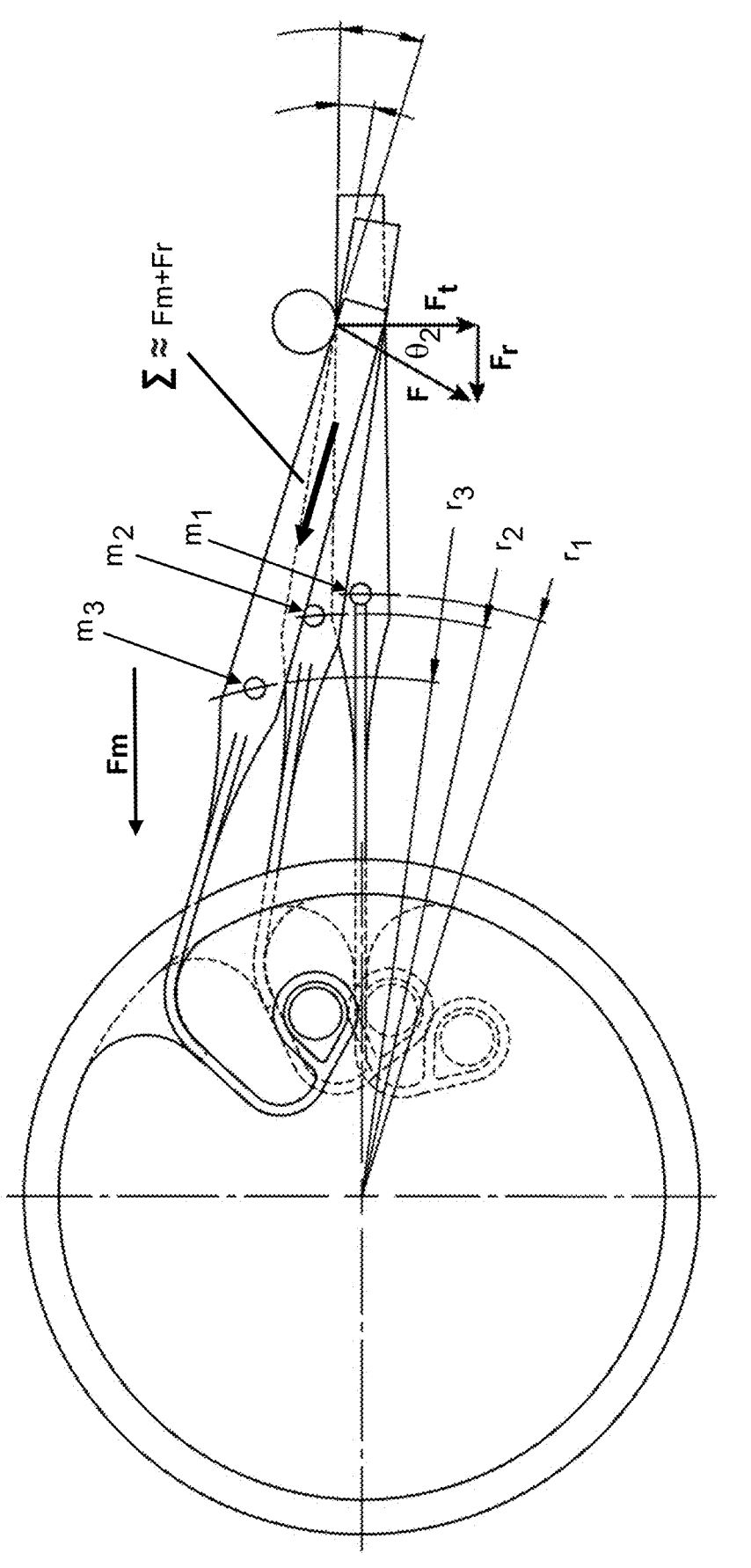
FIGS. 9-11 illustrate the mathematical calculations behind the advantages achieved by the cutting blade according to the described embodiments.
Figure 11:
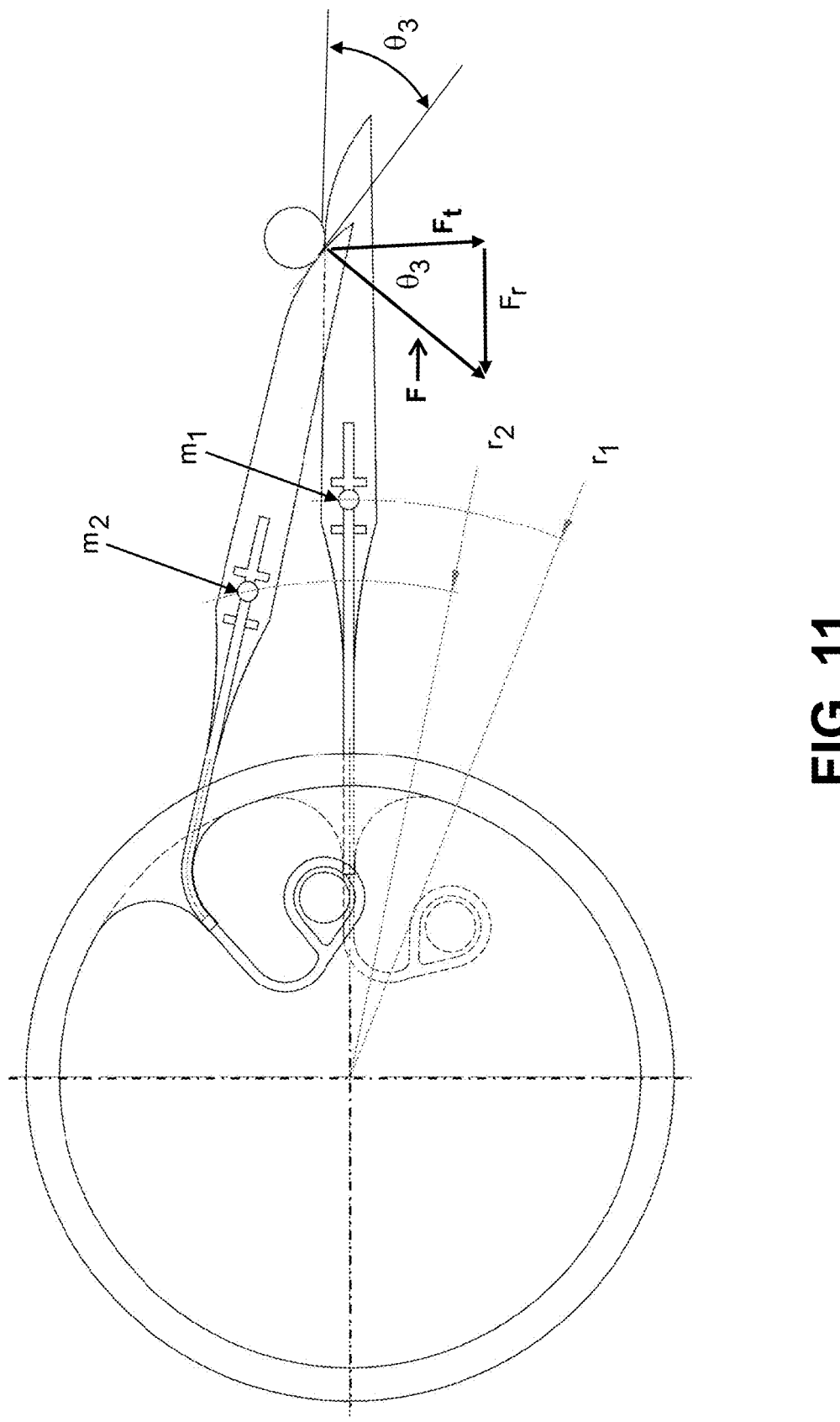

There are tangential forces $(F_t)$ and radial inward directional forces $(F_r)$. For a straight blade, at the initial point of impact, the radial force $(F_r)$ is zero, therefore, no inward radial force. However, the blade of the described embodiments has a sliding relief at initial impact due to the initial $\Theta_1$. The tangential Force $(F_t)$ is the torque the driving motor will react to when more power is needed during the impact event. With the tapered or trapezoidal blade of the described embodiments, the tangential force vector $(F_t)$ is reduced compared to the straight blade, which will in effect reduce motor driving torque waste. The described blade also creates a more inward force from its inward moving mass concentration. This helps as another force to produce a quicker releasing process from the inward mass force $(F_M)$. $F_M$ is an inward moving mass, as seen in FIGS. 9 and 11, that would be higher than with a straight blade because of the added mass of the blade closer to the center of rotation. When applying a study of the step-by-step diagram of the inward movement of the heavier blade mass toward the center of rotation, this force $F_M$ is additive to $F_r$ to help an earlier release from the obstacle. By reducing the total event engagement time, both motor torque required and adverse blade wear (consumption) are reduced.

The flexible living hinge, as incorporated in the flexible line blade, is now even more functional and beneficial because it allows a beneficial inward movement caused by the described blade's inward radial force vector $(F_r)$ and $(F_M)$ the inward mass movement. This will also help to reduce tensile stresses on the hinge itself, a problem that has been encountered when too much mass is added to the cutter for greater cutting kinetic energy. With the confined fixed hinge loading channel in the receiver, the hinge size is fixed and would not be increased within the receiver head (so that all different flexible line blades have the same hinge geometry), limiting the amount of mass designed into the cutter. The described blade can include added mass for better cutting capability.

The overall system uses softer materials with more flexibility to absorb the associated radial, tangential, twisting, and high impact forces.

Additionally, the tapered or trapezoidal blade of the described embodiments can be manually sharpened, e.g., with a sharp knife to remove impact burr(s).

The faster the cutting speed, the longer time it takes for the cutter to disengage, the more power wasted, the more the stress, the more wear to occur, therefore, the acceleration of the blade's destruction and wear. The blade of the described embodiments is designed to reduce both the power consumed and to increase the blade's useful life.

The hinge design of the described blade allows bending flexure opposite to the obstacle, which permits the blade to slide back or glide past the obstacle. Inherent to this action is that it allows the impact force (magnitude F) to resolve into two components: a reduced tangential component $F_t$, and an increased radial component $F_r$, directed inward to the axis of rotation, which corresponds to a centripetal force that acts to maintain circular motion and counters the outward pull on the hinge. FIG. 9 shows how the force vector F is resolved into components $F_t$ and $F_r$.

An added benefit accrues from the fact that as the blade deflects into a curvature, its entire length is subjected to reduction in radial distance, i.e. reduced radius arm, of each point on the blade. (The outermost tip must move in until it clears the object). By the conservation of angular momentum (a standard physical law), the angular velocity ($\omega$ rad/sec) increases. That is, if an element of mass, m, moves inward from $r_1$ to $r_2$ as shown in FIG. 9, then $m\omega_1 r_1 = m\omega_2 r_2$ or $\omega_2 = \omega_1(r_1/r_2)$. The increased rotational speed (or RPM) enhances cutting ability without increasing input energy. An illustrative analogy is the classic example used in basic physics lessons of a figure skater spinning with his/her arms out and then wrapping them inward to make the rotation more rapid.

Figure 10:
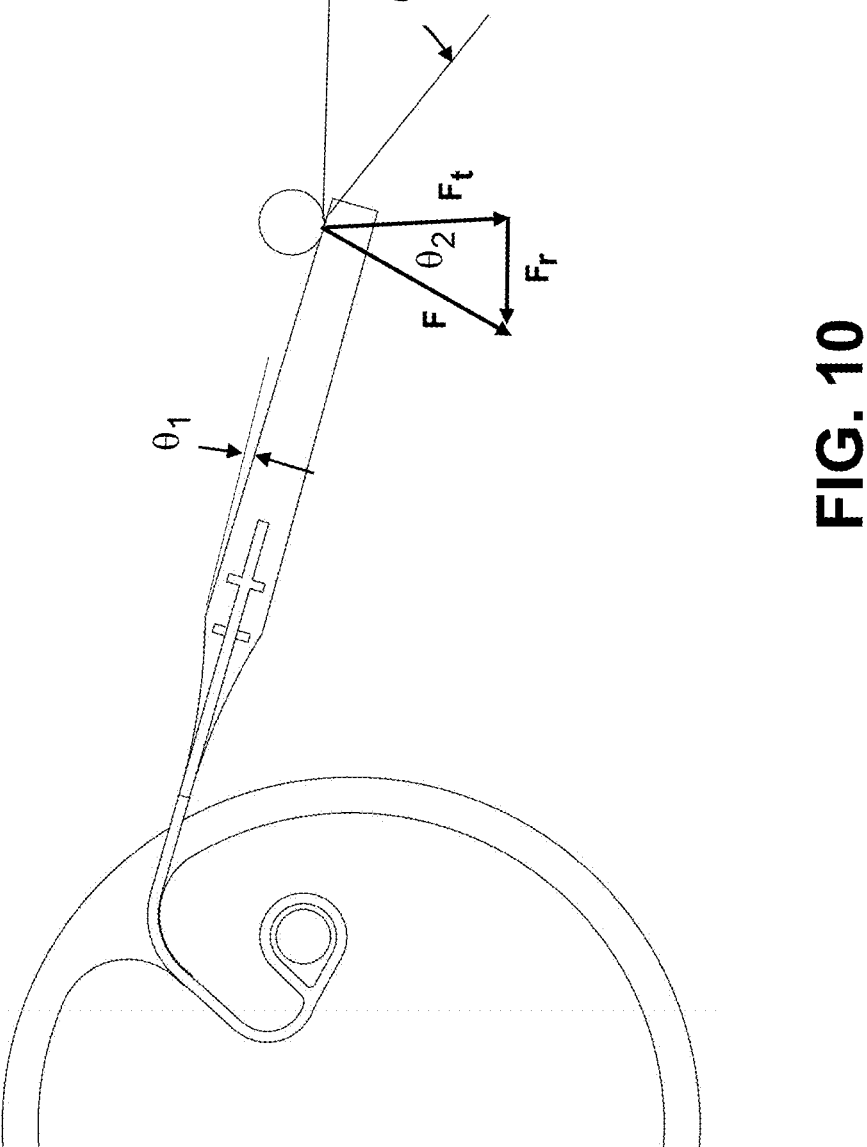

A second feature of the blade is its tapered, trapezoidal planform with the wider portion of increased mass inboard. The outward directed narrowing provides an additional "sweepback" angle to the normal (perpendicular to surface) impact direction added to the angle created by the blade flexure as shown in FIG. 10, where $\Theta_2$ is the angle due to flexure (to the order of 20+ degrees) and $\Theta_1$ is the blade taper angle (nominally greater than zero and less than or equal to 8 degrees). The taper provides further relief for enabling the blade to initially slide free of the obstacle and both further will decrease the tangential $F_t$ component to $\cos(\Theta_1+\Theta_2)F$ while increasing the radial component to $F_r=\sin(\Theta_1+\Theta_2)F$. The $F_t<F$ reduces the torque jolt on the motor and mitigates spikes relative to a straight, rigid blade (flail), and the $F_r$ increases the centripetal effect described above.

The tapered, generally trapezoidal shape of the described blade causes the mass to increase with decreasing radius so that the mass elements with long radii arms relative to the obstacle have increased moments of momentum that "pull" the blade past the obstacle to a greater degree than a straight blade.

With reference to FIG. 11, it has been shown in field testing that as the described blade undergoes wear, it develops a shallow curved shape with a further tapered or curved use angle ($\Theta_3$) thus further increasing the pushback force $F_r=\cos(\Theta_1+\Theta_2+\Delta\Theta)F$ or $F_r=\cos(\Theta_3)F$. The curved shape may also be formed during original manufacture. This is a phenomena itself that can be noted to resemble the shape of various historic battle swords that were known and proven for effective deep cutting and fast withdrawal clearing as noted above. It may be reasonably inferred that the natural shaping undergone by the described blade supplies added effectiveness to its cutting and escape capability.

Compared to a straight flexible blade, the blade of the described embodiments incorporates a unique (higher mass) concentration closer toward a center of rotation by providing an initial tapered or trapezoidal blade design that in some embodiments further wears or abrades into an assisting blade tip curvature, which enables a greater and more effective '$\Theta$'. The described tapered or trapezoidal blade improves both durability and power efficiency performance of straight flexible line blades (parallel/non-tapered). These features further enable a more rapid release of the fast-rotating cutters as they encounter the full (impact to release) event from an initial impact into a binding force, an obstacle they cannot cut through to a final release from the object. The adverse effects of more numerous and rapid impacts are destructive to any blade material with likely added fatigue to the cutters while also creating inefficient power consumption. The faster the release of the blade from the obstacle, the less fatiguing impacts to increase wear life. A reduction in motor torque is also beneficial when the cutters release quicker from the obstacle.

The tapered or trapezoidal construction of the described embodiments, with added flexibility and greater inward mass location, will effectively resolve the frequent shattering of common hard, pin pivoting, plastic blades when they impact solid obstacles they cannot cut.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A cutting blade for a rotating trimmer, the cutting blade comprising:
   a loading section at a proximal end securable to the rotating trimmer;
   a flexible hinge section extending from the loading section;
   a transition section extending from the flexible hinge section; and
   a cutting section extending from the transition section to a distal end,
   wherein the transition section and the cutting section are tapered at a taper angle toward the distal end, and wherein the cutting section is configured to wear via use such that one side of the cutting section tapers at a use angle greater than the taper angle.

2. A cutting blade according to claim 1, wherein a mass of the transition section is greater than a mass of the cutting section.

3. A cutting blade according to claim 1, wherein the cutting blade is rotated in a cutting plane, and wherein the flexible hinge section is oriented perpendicular to the cutting plane.

4. A cutting blade according to claim 3, wherein the transition section is oriented parallel to the cutting plane.

5. A cutting blade according to claim 1, wherein a center of gravity based on a mass of the cutting blade is positioned closer to the loading section than the cutting section.

6. A cutting blade according to claim 1, wherein a mass of the transition section is controlled by adding or subtracting material that affects a thickness of the transition section.

7. A cutting blade according to claim 1, wherein a cross-section of the cutting section is symmetrical.

8. A cutting blade according to claim 1, wherein a cross-section of the cutting section is trapezoidal.

9. A cutting blade according to claim 1, wherein the taper angle is less than or equal to 8 degrees, and wherein the use angle is greater than 8 degrees and less than or equal to 45 degrees.

10. A cutting blade for a rotating trimmer, the cutting blade comprising:
   a loading section at a proximal end securable to the rotating trimmer;
   a flexible hinge section extending from the loading section;
   a transition section extending from the flexible hinge section; and
   a cutting section extending from the transition section to a distal end,
   wherein the transition section and the cutting section are tapered at a taper angle toward the distal end, and wherein one side of the cutting section tapers at a use angle greater than the taper angle such that the cutting blade is configured for only clockwise rotation or only counterclockwise rotation.

11. A cutting blade according to claim 10, wherein the taper angle is less than or equal to 8 degrees, and wherein the use angle is greater than 8 degrees and less than or equal to 45 degrees.

12. A cutting blade according to claim 1, wherein the taper angle of the transition section and the cutting section is less than or equal to 8 degrees.

13. A method of manufacturing a cutting blade for a rotating trimmer, the method comprising:

(a) forming a loading section at a proximal end securable to the rotating trimmer;

(b) forming a flexible hinge section extending from the loading section;

(c) forming a transition section extending from the flexible hinge section; and (d) forming a cutting section extending from the transition section to a distal end, wherein steps (c) and (d) are practiced such that the transition section and the cutting section are tapered at a taper angle toward the distal end, and wherein step (d) comprises configuring the cutting section to wear via use such that one side of the cutting section tapers at a use angle greater than the taper angle.

14. A method according to claim 13, wherein steps (a)-(d) are practiced via molding.

15. A method according to claim 14, wherein steps (a)-(d) are practiced using nylon copolymers.

16. A method according to claim 13, wherein steps (a)-(d) are practiced such that a center of gravity based on a mass of the cutting blade is positioned closer to the loading section than the cutting section.

17. A method according to claim 13, further comprising controlling a mass of the transition section by adding or subtracting material that affects a thickness of the transition section.

18. A method according to claim 13, wherein the taper angle is less than or equal to 8 degrees, and wherein the use angle is greater than 8 degrees and less than or equal to 45 degrees.

19. A method of manufacturing a cutting blade for a rotating trimmer, the method comprising:

(a) forming a loading section at a proximal end securable to the rotating trimmer;

(b) forming a flexible hinge section extending from the loading section;

(c) forming a transition section extending from the flexible hinge section; and (d) forming a cutting section extending from the transition section to a distal end, wherein steps (c) and (d) are practiced such that the transition section and the cutting section are tapered at a taper angle toward the distal end, and wherein step (d) comprises tapering one side of the cutting section at a use angle greater than the taper angle.

\* \* \* \* \*